United States Patent

Douglas

[15] 3,680,881
[45] Aug. 1, 1972

[54] LINKAGE MECHANISM

[72] Inventor: Kenneth R. Douglas, 3760 Davie Blvd., Fort Lauderdale, Fla. 33314

[22] Filed: Dec. 5, 1969

[21] Appl. No.: 882,801

[52] U.S. Cl. .............................. 280/96.2 R, 74/103
[51] Int. Cl. ................................................ B60g 3/18
[58] Field of Search ....... 74/103, 101, 102; 280/96.2; 267/20 A

[56] References Cited

UNITED STATES PATENTS

| | | | |
|---|---|---|---|
| 1,310,365 | 7/1919 | Moore et al. | 74/101 |
| 2,299,241 | 10/1942 | Kumm | 280/96.2 |
| 3,118,687 | 1/1964 | Forbush | 280/96.2 |
| 2,094,582 | 10/1937 | Chapman | 267/20 |
| 3,312,980 | 4/1967 | Erbach | 74/103 X |
| 3,501,120 | 3/1970 | Daniel | 74/103 X |

FOREIGN PATENTS OR APPLICATIONS 864,184  1/1953  Germany ..................... 74/101

*Primary Examiner*—Kenneth H. Betts
*Attorney*—Eugene F. Malin

[57] ABSTRACT

A linkage mechanism coupling a supporting structure and a moveable member for insuring relative linear motion of the moveable member. A controlled arm and a radial lever are so coupled along a center line to the supporting structure and each other that a controlled arm end is restricted to substantially linear motion only for a predetermined segment of its path.

1 Claim, 5 Drawing Figures

PATENTED AUG 1 1972　　　　　　　　　3,680,881
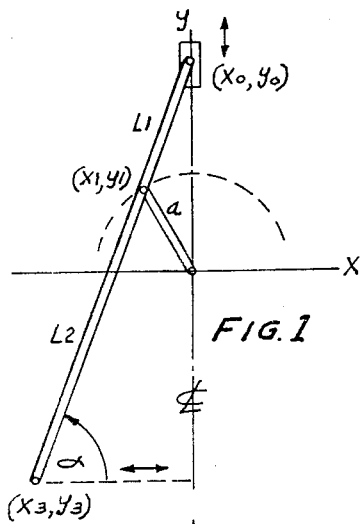
FIG. 1
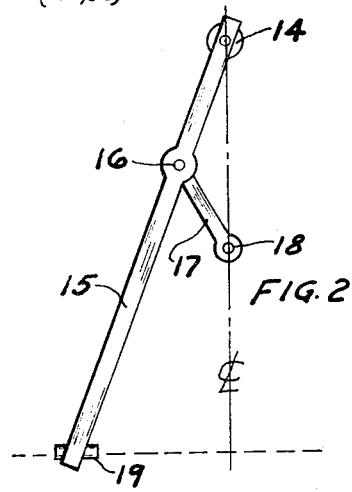
FIG. 2
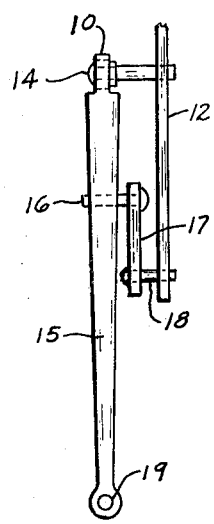
FIG. 3
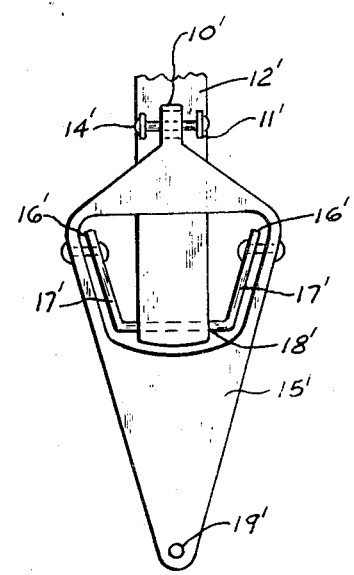
FIG. 4
FIG. 5
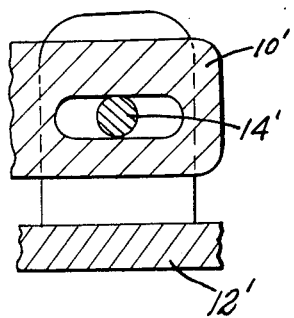
KENNETH R. DOUGLAS
INVENTOR.
BY  *Eugene T. Phalen*
ATTORNEY

LINKAGE MECHANISM

BACKGROUND OF THE INVENTION

This invention relates generally to a linkage mechanism that may be used to couple a moveable member to a supporting structure in such a way that the moveable member is restricted to a predetermined linear path with respect to the supporting structure. In the past, complex mechanisms have been employed to accomplish such a result. Applicant discloses a non-complex linkage mechanism that provides such motion. Such a mechanism finds application in an automobile independent wheel suspension system in which a wheel is coupled to the automobile frame. It is desirous in such a vehicle that any vertical motion of the wheels by only in a linear direction perpendicular to the ground in order to provide more stability and less tire wear.

BRIEF SUMMARY OF THE INVENTION

A linkage mechanism for restricting the motion of a moveable member coupled to a supporting structure to a predetermined substantially linear path with respect to the supporting structure comprising a supporting structure, a controlled arm having one end coupled to said supporting structure by a slip joint along a center line allowing linear motion of said end in a first direction, a radial lever rotatably connected at one end to said supporting structure and at the opposite end to a point along the length of said controlled arm. The midpoint of the linear path of one end of the controlled arm is on a straight line passing through the connecting point of the radial lever and the supporting structure and at an initial rest position, the radial lever and the controlled arm are parallel in a plane which includes the linear path midpoint. The radial lever produces a point on the controlled arm that moves only in a circular motion. The end of the controlled arm not coupled to the supporting structure will thus be restricted to motion in a substantially linear direction, the motion being substantially perpendicular to a line through the radial lever pivot point and the controlled arm hinged point on the supporting structure. The length of the resulting linear path will be a function of controlled arm length, radial lever length, the location of the connecting point of the radial lever along the controlled arm length, and the angular movement from the center line.

It is an object of this invention to provide a non-complex linkage mechanism that provides restricted linear motion along a particular point of the mechanism.

It is another object of this invention to provide a linkage mechanism that may be used in an independent wheel suspension system to insure linear motion of a wheel moving in a vertical direction.

It is yet another object of this invention to provide a linkage mechanism having few moving parts that provides linear motion of an attached object.

In accordance with these and other objects which will be apparent hereinafter, the instant invention will now be described with particular reference to the accompanying drawings.

BRIEF DESCRIPTION OF THE DRAWINGS

In the drawings:

FIG. 1 shows a geometrical drawing for explaining applicant's invention.

FIG. 2 shows a side view of applicant's invention.

FIG. 3 is a top view showing applicant's basic linkage mechanism.

FIG. 4 is a top view of applicant's invention as used in an independent wheel suspension system on a vehicle.

FIG. 5 is a rotatable slip joint in cross-section.

PREFERRED EMBODIMENT OF THE INVENTION

Referring now to the drawings, and in particular FIG. 1, a geometrical diagram is shown to more fully understand applicant's invention. FIG. 1 shows a coordinate system ($x$, $y$ axes). The $y$ axis represents a center line to which one end of a bar L is slideably and rotatably attached at point ($x_o$, $y_o$). Along the bar at a distance $L_1$ from point ($x_o$, $y_o$), a lever arm of length "$a$" is rotatably attached. The lever arm pivots around the center of the coordinate system $x=0$, $y=0$. At a distance $L_2$ from point ($x_1$, $y_1$) is the point whose motion is of interest ($x_3$, $y_3$). As point ($x_3$, $y_3$) moves away from the $y$ axis, the bar makes a smaller angle $\alpha$ with the perpendicular to the axis. It can be shown that as the angle $\alpha$ decreases from 90°, the point ($x_3$, $y_3$) moves in substantially a linear path for a distance that depends on the bar length L, the length of lever arm "$a$" and length of bar segment $L_1$. As angle $\alpha$ decreases, in general, a family of lines is generated of the type $y=kx+c$ where "$k$" is the slope of the line, which in this case is the $-\tan \alpha$. This yields $y_o-y_3=-\tan\alpha (x_3)$. Substituting for $y_o$ in terms of $L_1$, $a$, and $\alpha$ yields $y_3+(L_1 \cos \alpha + a^2-L_1^2 \sin^2)=\tan \alpha (x_3)$ (see FIG. 1). Transposing and reducing each side gives: $y_3=(L-L_1) \sin \alpha - (a^2-L_1^2 \cos^2 \alpha)^{1/2}$. This shows that $y_3$ remains substantially constant for values of $\alpha$ and $x_3$ near the $y$ axis.

FIGS. 2, 3, and 4 show one preferred embodiment of applicant's linkage mechanism as employed in an independent wheel suspension system for a vehicle, such as an automobile. FIG. 2 shows a side view of controlled arm 15 rotatably attached at 16 to a lever arm 17. The lever arm 17 is rotatably fixed at anchor point 18 to the vehicle frame (not shown) as is rotating slip joint 14 which allows both rotating and linear motion along the centerline. Ball joint 19 will then move in a substantially linear direction perpendicular to a centerline through the anchor points on the vehicle frame attached at 14 and 18. Ball joint 19 is anchored to the steering spindle of the vehicle (not shown).

FIG. 3 shows a top view of how the basic mechanism may be joined to a rigid structure, such as an automobile frame 12. Bearings 14, 16, and 18 rotate, while 10 and 14 together form a rotating slip joint that moves linearly along the centerline (FIG. 2).

FIG. 4 shows a top view of the mechanism adapted to a vehicle having dual lever arm 17' joined by a cross bar bearing 18' that is rotatably attached to frame 12'. Attaching segment 10' and bearing 14' act as a rotating slip joint. Bearing supports 11' hold bearing 14' above frame 12.

In operation in a vehicle, the normal steering geometry utilizes the radii of control arms to attain a nonscrubbing point of contact of the tire with the ground. As the vehicle moves over a surface that is not perfectly flat, any up and down movement at ball joint anchor point 19' will cause the lever arm 17' to rotate about a centerline and the controlled arm 15' to move horizontally at the slip joint bearing 14'. Thus as shown above, ball joint anchor point 19' will be restricted to movement only along a vertical line perpendicular to the center-line.

For the vehicle front end, steering arms of the same linkage design would be employed. Both front and rear independent wheel systems are possible using applicant's invention.

Variations within the scope of the invention are possible. The linkage system may be strengthened by employing multiple controlled arms, each having centerline positions that are parallel to each other and having separate radial pivot arms. Each controlled arm is positioned so that the restricted motion of each arm is along the same line. Thus, an object connected to each controlled arm end so disposed must also be restricted to linear motion.

The instant invention has been shown and described herein in what is considered to be the most practical and preferred embodiment. It is recognized, however, that departures may be made therefrom within the scope of the invention and that obvious modifications will occur to a person skilled in the art.

What I claim is:

1. A linkage mechanism for providing straight line motion to the end point of a moveable linkage arm comprising:

a supporting frame member;

a pivot bar fixed to said frame member;

said linkage arm having a rotatable slip joint coupled at one end to said pivot bar;

a u-shaped guide bar rotatably coupled to said supporting frame member along a middle portion of said guide bar, each end of said guide bar rotatably coupled to opposite sides on said linkage arm at a predetermined longitudinal position on said linkage arm from said linkage arm rotatable slip joint whereby the linkage arm end opposite the end having the rotatable slip joint is moveable in a straight linear path only.

* * * * *